June 6, 1972   R. S. ALM   3,667,851
MEASURING SYSTEM FOR AN ANALYTICAL CENTRIFUGE
Filed Jan. 6, 1970   3 Sheets-Sheet 1

Rasmus Strande Alm,
INVENTOR

United States Patent Office 3,667,851
Patented June 6, 1972

3,667,851
MEASURING SYSTEM FOR AN ANALYTICAL CENTRIFUGE
Rasmus Strande Alm, Osteras, Norway, assignor to Norsk Hydro-Elektrist Kvaelstofaktieselskao, Oslo, Norway
Filed Jan. 6, 1970, Ser. No. 970
Claims priority, application Norway, Jan. 6, 1969, 39/69
Int. Cl. G01n 15/04
U.S. Cl. 356—197                                10 Claims

ABSTRACT OF THE DISCLOSURE

A measuring system for an analytical centrifuge having a rotor with two or more preferably swinging sedimentation cells to be scanned by light passage. The scanning means has a preferably adjustable and preferably curved optical slit through which the light passes to reach the rotor and traverses a radially extending slit located in front of each sedimentation cell. A cathode ray tube with a vertical deflection system has applied thereto signals generated by the light beam passing through the sedimentation cells. A synchronizing means causes the horizontal deflection in the cathode ray tube according to the light scanning of each separate cell during the rotation of the rotor. Trigger means has one or more members rotating with the rotor cooperating with one or more stationary members making possible simultaneous observation or registration of the measuring curve for two or more arbitrarily chosen sedimentation cells on the cathode ray tube.

---

Figure 1:
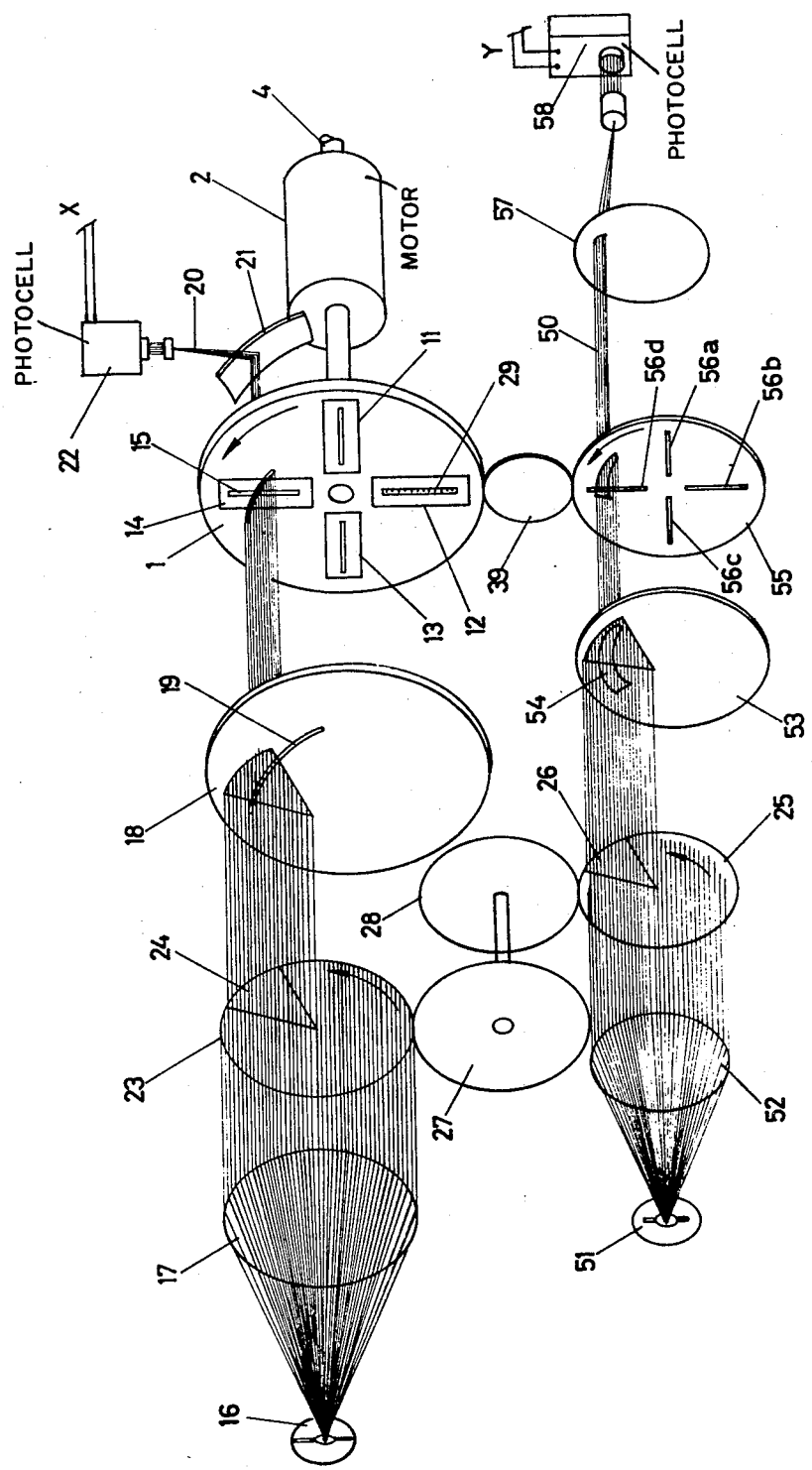

This invention relates to a new measuring system for an analytical centrifuge of the type having a rotor with two or more sedimentation cells adapted to be scanned by light passage. The sedimentation cells in the centrifuge can be of the swinging type, which involves certain practical advantages when the rotor axis is vertical.

With analytical centrifuges it is an essential problem to present measuring data or curves relating to the separate measuring cells while the centrifuge is running. It is usually of interest to observe or register how the sedimentation process proceeds as a function of time during the centrifugation. The reason why there is in many instances used several sedimentation cells in a centrifuge rotor is that this results in large capacity of the equipment, i.e. that more sedimentation tests can be carried out at the same time.

To be able to obtain the above objectives a number of different methods have been used. In German patent specification No. 1,145,388 there is a general description of methods in which to be able to register one or more cells in a centrifuge rotor there is applied an electro-optical device located between the sedimentation cell and a radiation receiver. By means of a device outside the rotor, but controlled thereby and actuating the electro-optical component, the light passage can be blocked except when the cell which is to be registered, is present therein. Another method described in the above patent specification consists in blocking the electrical signal from the radiation receiver to the registration apparatus instead of blocking the light passage from cells not to be registered.

In German patent specification No. 1,149,188 there is described other practical ways of preventing the function of the radiation receiver or the registration apparatus except when the cell of interest is present in the radiation path.

The above and other previously known methods have all in common the fact that they only aim at registration of one sedimentation cell in the rotor at a time and the object is only to increase the capacity of the centrifuge by making several analyses simultaneously. Further, it is a prerequisite of these methods that the registration is made in another way than the one being presumed in the present invention which is based on an original optical-electronical scanning system.

With the recently developed centrifugation method known as zonal-centrifugation the obtainable separation effect has been substantially increased and this has led to a need for better methods for an analytical follow-up of the separation process, and the present invention has for one of its objects to satisfy this need.

The scanning method for examining the patricle distribution in a sedimentation cell in a centrifuge rotor as described in British patent specification No. 1,063,057 is an example of employment of a specific adjustable optical slit in a scanning system using two optical slits which are crossing each other and of which one is mounted on the rotor in front of a sedimentation cell and the other is stationary. This optical scanning system is combined with the provision of a cathode ray tube for presentation of the scanning results. The stationary curved split described in the above British patent specification need not be curved and does not have to be adjustable either, although both these features usually will be advantageous. The present invention is based on the employment of this scanning system in connection with a presentation of the measuring results by means of a cathode ray tube in such a way that the measuring results from two or more arbitrary cells can be presented simultaneously on the screen of the cathod ray tube. This results in great advantages as will be apparent from the following.

In the zonal method there is used a density gradient in the liquid in the sedimentation cell in such a way that the density increases in the cell in a direction outwardly from the rotational centre. This is necessary to obtain stable conditions in the cell and a correct sedimentation, but it involves several complications. Together with the density gradient brought about by variation in the composition of the liquid, there will also be a viscosity gradient and a refractory index gradient. In many applications it is also desirable to have a strongly increasing viscosity towards the termination of the sedimentation. These conditions with varying liquid characteristics in the radial extension of the cell lead to results involving very complicated calculations and it will also frequently be desirable with a very exact temperature control in addition to velocity control so as to obtain a desired exactitude.

The measuring system according to the present invention represents a simple and effective solution to the above problems which arrise with the application of a density gradient in sedimentation cells. For instance one of the sedimentation cells may contain particles of known sizes, such as a mixture of monodisperse particles with respective diameters 0.1–0.2–0.3 micron and so on. If another cell contains the same type of particles, but with unknown sizes, then the radial positions in the cell with unknown particle sizes corresponding to those positions in the reference cell where the known particle sizes are found, will contain the same particle sizes. Particle sizes between these positions can be found by interpolation. Since both cells are subject to the same conditions with respect to temperature and velocity and further contain the same sedimentation liquid, the exactitude of the measuring results will be independent of these factors and the measuring results are obtained in a direct way without any calculation. It is also possible to use reference particles of another type than those to be examined and also different liquid gradients in the two cells, but it is then necessary to have calculated tables so as to be able to read out the unknown particle sizes on the basis of the positions of the reference particles. In this case too the rotational velocity will have no influence and the requirements as to temperature control are much reduced.

The measuring system makes possible differential measurements of various kinds in which differences in two samples can be observed directly and in which high precision is easily obtained because two or more cells are subjected to exactly the same temperature and velocity conditions.

These advantages are obtained in the measuring system according to the invention primarily by the combination of (a) Scanning means comprising a preferably adjustable and preferably curved optical slit as known per se, through which the light passes to reach the rotor and therein traverses a radially extending slit located in front of each sedimentation cell, (b) A cathode ray tube to the vertical deflection system of which are applied signals generated by that light beam which is passing through the sedimentation cells, (c) Synchronizing means to cause horizontal deflection in the cathode ray tube according to the light scanning of each separate cell during the rotation of the rotor, and (d) Trigger means comprising one or more members rotating with the rotor and in cooperation with one or more stationary members makes possible simultaneous observation or registration of the measuring curve for two or more arbitrarily chosen sedimentation cells on the cathode ray tube.

The measuring curves from the indvidiual cells may as desired be superposed on the cathode ray tube screen or presented in a horizontal sequence, and when employing a double-beam tube also in a vertical sequence. When using a cathode ray tube with memory still further combinations may be obtained.

As the scanning pictures from the cells chosen are shown on the cathode ray tube screen as stable, simultaneous curves, it will be possible to carry out a direct observation of similarities or differences between various samples without resorting to the conventional method in which the results from each cell are registered separately and the registered data then being compared later.

In the measuring system according to the invention the horizontal deflection on the cathode ray tube screen is carried out in such a way that the deflection has a constant value independent of the rotational velocity of the rotor. This is of importance because the velocity can be different not only from one test to another, but also during one and the same run. The observation and registration of curves will of course be simplified when the horizontal extension is constant. This can be provided for either optically or purely electronically.

Further, in the measuring system according to the invention there is used control and modulation, respectively, of the intensity of the electron beam. This can in the first place be utilized for selecting that or those sedimentation cells the curves of which it is desired to present on the cathode ray tube screen, and in the second place for specific marking of the separate curves being presented on the screen, so that the same can be distinguished from each other during a direct comparison.

Other specific and advantageous features of the measuring system according to the invention and further applications thereof will appear from the following description of an examplary embodiment and from the claims.

Figure 2:
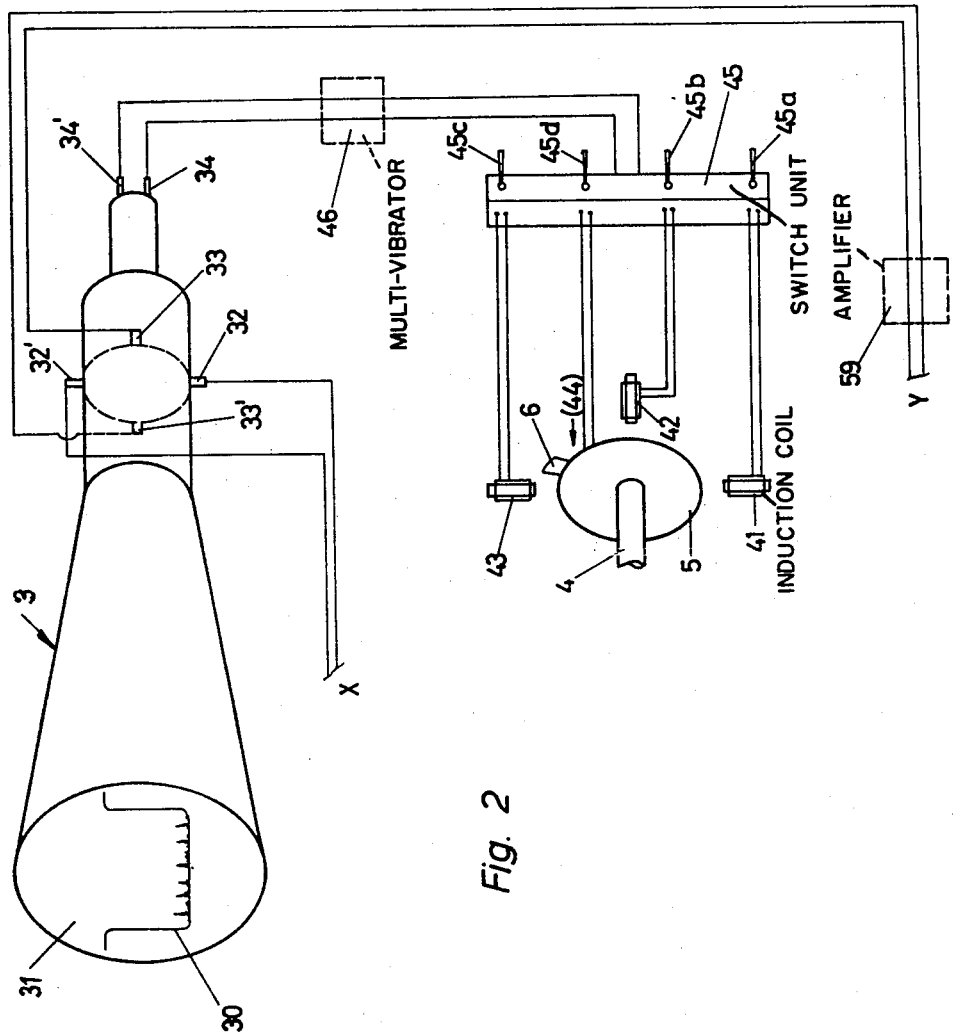

FIGS. 1 and 2 together show diagrammatically a complete measuring system based on the use of optical methods.

Figure 3:
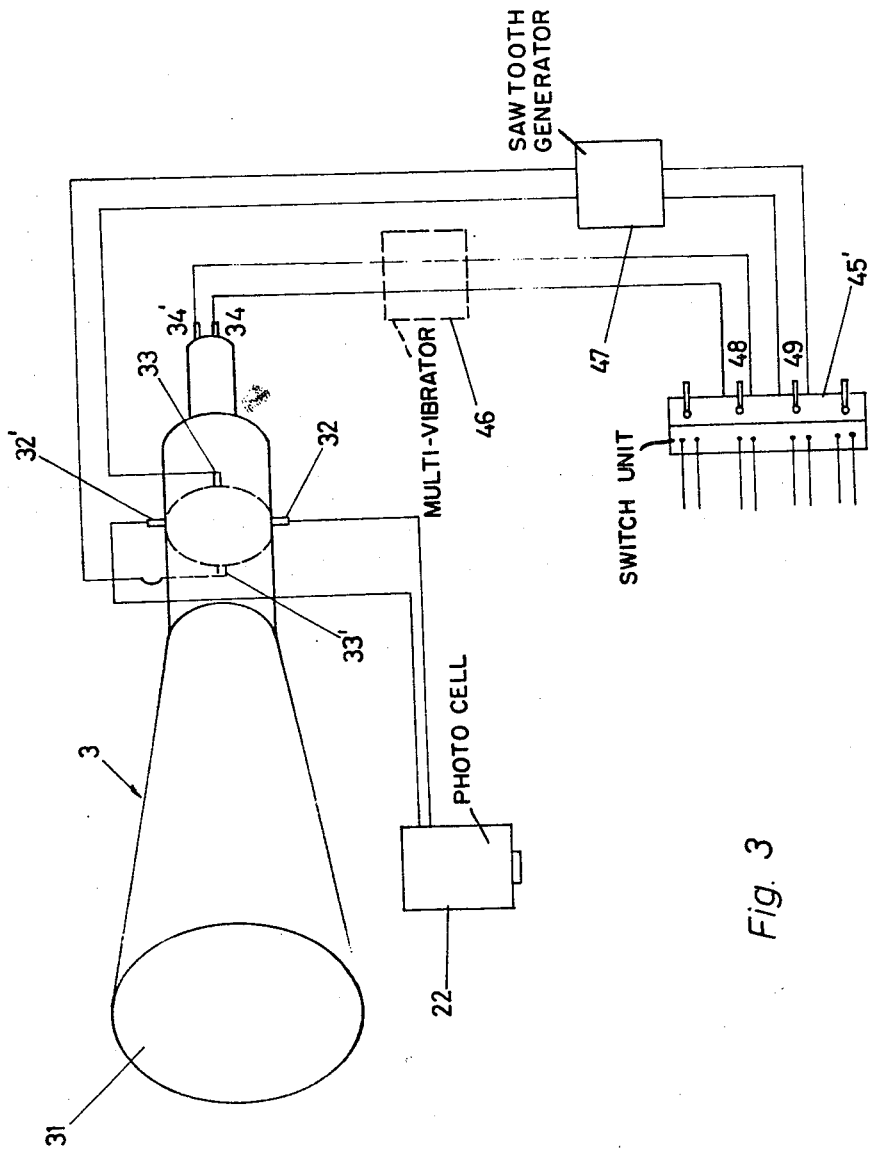

FIG. 3 shows diagrammatically a system constructed generally in the same way as the one in FIGS. 1 and 2, but with electronic circuits in replacement of a part of the optical system.

The most important components of the centrifuge proper as shown diagrammatically in FIGS. 1 and 2, are a rotor 1 being driven by a motor 2 the axle of which is designated with the numberal 4. The rotor has four sedimentation cells 11, 12, 13 and 14 respectively, each being provided with a window 15 so that light or other radiation can traverse the cell in an axial direction. On the cell 12 there is at 29 indicated a radial marking or scale which can be of particular value in connection with the presentation of measuring curves by means of a cathode ray tube 3.

The cathode ray tube 3 has a screen 31 on which there is indicated a measuring curve 30. The cathode ray tube can be a component specifically adapted to the measuring system or it can be part of a conventional oscilloscope which is included in the measuring system.

For scanning each sedimentation cell in the rotor 1 in a radial direction there is provided an optical system comprising a light source 16 and a lens 17 which emits a parallel light beam towards a preferably adjustable and curved optical slit 19 as mentioned in the introductory part of this description. It should be noted at this point that a rotating mask 23 is not always necessary and the function thereof will therefore be explained later. Thus, here it can be presumed that the whole of the optical slit 19 is illuminated and will pass a corresponding curved light beam which will reach the rotor 1. During the rotation thereof the individual sedimentation cells 11, 12, 13 and 14 respectively, in succession will be scanned in a radial direction from the inner part and outwardly by means of the curved light beam which comes from the slit 19. In the position of the rotor as shown in FIG. 1 the cell 14 is being scanned and, as will be seen from the figure, a smaller light beam corresponding to the area of intersection between the window 15 and the curved light spot on the rotor 1, will traverse the sedimentation cell 14 and is deflected by means of a mirror or a prism 21 to give a light beam 20 which reaches a photocell 22. The light beam 20 will in a way known per se vary in intensity depending upon the variations in light transmittivity along the cell 14 in radial direction. The electrical signal from the photocell 22 will vary correspondingly and is applied to a vertical deflection system 32–32' in the cathode ray tube 3.

For the horizontal deflection there is provided a second optical system comprising a light source 51 and a lens 52 directing a parallel light beam against a stationary mask or screen 53. In this case there is also shown a rotating mask 25 which at this stage will not be discussed since the same is of interest only in particular instances. A description thereof will be given later in connection with the previously mentioned mark 23. In the stationary mask 53 there is formed a curved slit 54 with a gradually increasing width. Since the mask 25 is regarded as removed, the slit 54 can be thought to be illuminated in its entirety. Behind the stationary mask 53 in the direction of the light path there is provided a rotating mask 55 which rotates with the same rotational velocity as the rotor 1. There is accordingly indicated a coupling between these rotating elements by means of a wheel 39. The rotating mask 55 has a number of radial and linear slits 56a–56d corresponding to the number of sedimentation cells in the rotor 1. The slit 54 in the mask 53 results in a curved light spot with increasing width on the rotating mask 55, and during the rotation thereof the respective radial slits 56a, 56b, 56c and 56d in succession will pass a light beam 50 which during the passage of each slit has an increasing cross-section corresponding to the increasing width of the slit 54. By means of a lens 57 and a photocell 58 there is generated a corresponding electrical signal, for instance in the form of a linearly increasing voltage which is applied to the cathode ray tube horizontal deflection system 33, 33', possibly through an amplifier 59. When the rotating mask 55 is rotating with the same velocity as the rotor 1 and in relation to the location of the slit 54 in the stationary mask 53 has a correct angular position compared with the sedimentation cells and the scanning system thereof, there will be obtained a correct synchronization between the horizontal deflection and the vertical deflection in the cathode ray tube 3.

It will be understood that other arrangements than the one discussed above can also be used. Instead of the curved slit in the stationary mask there can be provided a number of holes covering the same angular extension. This arrangement is combined with the so-called diode pump and reset means.

Another important part of the measuring system according to the invention is the trigger means which among others has the important function of enabling the selection of that or those sedimentation cells the curves of which shall be presented by means of the cathode ray tube 3. This arrangement comprises a disk 5 provided on the motor axle 4 and having a magnet member 6 which acts on a number of stationary members 41, 42, 43 and 44 respectively, having for instance the form of induction coils. These induction coils are connected to a switch unit 45 by means of which they can be connected to terminals 34, 34' for control or modulation of the intensity of the electron beam and thereby the light intensity thereof on the screen 31. Between the switch unit 45 and terminals 34, 34' there can alternatively be inserted a multivibrator 46 which can provide for amplification and shaping of the comparatively weak pulses from the induction coils 41–44. The cathode ray tube 3 can be arranged so that a voltage of sufficient value applied to the terminals 34, 34' will suppress the electron beam so that there will be no trace displayed on the screen 31. On this condition the individual switches 45a, 45b, 45c and 45d in the unit 45 will be set so that the induction coils corresponding to sedimentation cells the curves of which are not desired, are connected to the terminals 34, 34', whereas induction coils corresponding to cells the curves of which shall be displayed, are not being coupled to the cathode ray tube terminals 34, 34'. In this connection it should be made clear that the magnet member 6 and the induction members 41–44 have such a position mutually and with respect to the sedimentation cells in the rotor 1 that the voltage pulse generated via the multivibrator 46 for a given induction member will coincide in time with the time interval during which the corresponding cell is being scanned by light passage.

Instead of the above arrangement based on magnetic induction effect, arrangements based on magnetic induction effect, arrangements based on photoelectrical components could be used in the trigger means.

In connection with FIGS. 1 and 2 it should be emphasized that the same only represents a diagrammatic and much simplified illustration of the system according to the invention. Thus, for clarity the rotor axis is shown horizontal, whereas the same in practice in the case of swinging sedimentation cells will be vertical. Further, it is possible to modify the form of the individual parts of the optical arrangement. One particular modification which will be discussed more closely, is an increase of the number of sedimentation cells to for instance five or six. This will require a certain fundamental change in the optical arrangements of FIGS. 1 and 2.

The more fundamental modification which is necessary when increasing the number of cells above a certain limit, for instance four, is due to the fact that the curved slit 19 in the stationary mask 18 must have a certain angular extension over the rotor 1 so as to be able to render a useful scanning of each sedimentation cell. When increasing the number of cells the angular spacing thereof will be smaller and there is a point at which two cells are at the same time within the angular range covered by the slit 19. Such overlapping, however, cannot be permitted and so as to prevent this there is inserted a further rotating mask 23 which restricts the illumination of the slit 19 to a certain percentage thereof, as shown in FIG. 1 with the sector shaped light spot on the mask 18. This sector shaped light spot is brought about by means of a sector shaped aperture 24 in the rotating mask 23. The mask 23 is rotated with a velocity deviating from the velocity of rotor 1, and the rotational velocity of the mask is preferably substantially lower than the velocity of the rotor 1. For each revolution of the rotor 1 in this case only a portion of the radial extension of each sedimentation cell will be scanned, but in the course of some revolutions the entire cell will be scanned since the sector 24 is displaced relatively to the slit 19 and therefore during a certain time period will have illuminated the same in its entirety. A similar effect is resulting from the further rotating mask 25 with a sector shaped aperture 26 in the light beam from the light source 51 in the synchronization means. Between said further rotating masks 23 and 25 there is in FIG. 1 indicated a mechanical coupling by means of wheels 27 and 28 which provide for synchronous drive of these further rotating masks.

As indicated in the introductory part of this description the synchronization means 51–58 can be replaced by an electronical system for generating a synchronized horizontal deflection voltage for application across the terminals 33, 33'. Such solution is illustrated in FIG. 3. From a particular output 49 of a switch unit 45' shown in this figure the voltage from induction coils corresponding to those sedimentation cells for which presentation of the respective curves is desired, is led to a saw tooth generator 47 which by means of electronic circuits as known per se generates a voltage which is applied to the horizontal deflection system 33, 33' so that the horizontal deflection will have a constant value independent of the rotational velocity of the rotor 1. The output 48 of the switch unit 45' is connected to the induction coils in the same way as explained above in connection with FIGS. 1 and 2.

Such an electronic system for horizontal deflectoin can more specifically consist of for instance an arrangement comprising an induction coil for each measuring cell, the object of which is to deliver a starting pulse for the horizontal movement of the electron beam, and further induction coils located in such a way that for each measuring cell there is generated a pulse when the rotor has rotated with an angle corresponding to the scanning angle of interest. This can be combined in an electronical system consisting of a one-shot saw tooth generator with variable rise time, and which delivers a pulse when the output voltage has reached a certain value, and a logical system which by means of the two latter pulses generates correction pulses which automatically correct or adjust the rise time of the saw tooth generator. Selection of that or those cells which are to be studied then takes place by suppressing the starting pulses from the remaining cells, as described for the trigger arrangement above.

The essential thing with the synchronization means whether the same is of the optical or the electronical type is that the horizontal deflection in the cathode ray tube shall take place synchronously with the rotation of the centrifuge as long as a measuring or sedimentation cell is scanned, and shall thereafter return quickly to the initial or starting position.

There can be provided a special electronic circuit for modulating the intensity of the electron beam by varying the voltage applied to the terminals 34, 34'. As indicated previously such modulation of the electron beam can be used to distinguish two or more curves which appear on the screen simultaneously, for instance by displaying the curves in a dot-and-dash way or the like. Input signals to the above circuit can be derived from the switch unit 45 and 45' respectively. It is also possible to include this function in the multi-vibrator 46 if there is provided one such multi-vibrator for each sedimentation cell.

It can also be mentioned that the marking 29 on one of the cell windows will result in corresponding small peaks in the corresponding curve on the cathode ray tube screen, which gives an absolute reference for the radial distances in the cell. Thereby moderate requirements to the optical-electronical system for the horizontal deflection in the cathode ray tube can be set.

In certain cases it may be an advantage to use the measuring system according to the invention by filling that cell which has distance markings (cell 12 in FIG. 1) with a so-called gradient liquid without particle samples. The curve displayed for this cell then in addition to the zero line (100% light transmission) and the zero transmission line will also show the above markings as a radial absolute reference. In another cell there can be introduced a sample with different particle sizes of Standard monodispersed particles. The sedimentation distances thereof serve as a basis for calculation of the samples which are being analyzed and which are contained in the remaining cells. Alternatively these can contain the same sample, but in different concentrations. Another method consists in comprising various unknown samples directly with a Standard sample (for instance a production Standard).

The measuring equipment according to the invention can be supplemented with a photographic camera to register the curves displayed on the cathode ray tube screen in a way known per se.

What is claimed is:

1. Measuring system for an analytical centrifuge comprising a rotor, a plurality of sedimentation cells to be scanned by light passage associated with said rotor, a light source, scanning means having a slit through which the light from said light source passes to reach said rotor, said rotor having a radially extending slit in front of each of said sedimentation cells through which said light passes, photosensitive means generating electrical signals in response to the light beam passing through said sedimentation cells, a cathode ray tube having a vertical deflection system to which said electrical signals are applied, means for causing a horizontal deflection in said cathode ray tube simultaneously with the light scanning of each separate cell during the rotation of said rotor, trigger means for triggering the horizontal deflection of said cathode ray tube comprising a member rotating with said rotor, stationary members equal in number to said sedimentation cells cooperating with said member, switch means enabling a plurality of said stationary members to be selectively and simultaneously connected to electric means to effect triggering of said horizontal deflection of said cathode ray tube whereby simultaneous observation or registration of measuring curves for two or more arbitrarily chosen sedimentation cells superposed on said cathode ray tube is made possible.

2. Measuring system according to claim 1 wherein said means for causing a horizontal deflection comprises a circuit for generating a periodical output signal increasing with time by the application of an input signal above a certain threshold value.

3. Measuring system according to claim 1 wherein said means for causing a horizontal deflection comprises a second light source, a stationary mask having a curved slit which has a gradually increasing radial width, a mask rotating synchronously with said rotor having a plurality of radially extending slits corresponding to the number of said sedimentation cells, a photocell responsive to the light beam which from said second light source passes through said stationary mask and said rotating mask and delivers a corresponding electrical signal to said horizontal deflection system of said cathode ray tube.

4. Measuring system according to claim 1 wherein said trigger means comprises a switch to connect one or more of said stationary members with the input of electronic means whose output serves to control the intensity of the electron beam so that only signals from desired sedimentation cells are displayed on the screen of said cathode ray tube.

5. Measuring system according to claim 1 wherein a window on one of said sedimentation cells is provided with distance markings which are shown as a radial scale on the screen of said cathode ray tube.

6. Measuring system according to claim 1 wherein a rotating mask having a sector shaped aperture is inserted in the light path so that it restricts the transmitted light to a portion of the length of said slit, means for driving said rotating mask with a rotational velocity which is substantially different from that of said rotor and being rotatable about an axis through the center of said slit.

7. Measuring system according to claim 1 comprising means to modulate the intensity of the electron beam differently for each of said individual sedimentation cells so that by observation of several curves on the screen of said cathode ray tube it is possible to identify each separately.

8. Measuring system according to claim 1 wherein said means for causing a horizontal deflection gives a horizontal deflection with a constant value independent of the rotational velocity of said rotor.

9. Measuring system for an analytical centrifuge comprising a rotor having a plurality of sedimentation cells to be scanned by light passage, a light source, scanning means comprising a slit through which the light from said light source passes to reach said rotor, said rotor having a radially extending slit in front of each of said sedimentation cells through which said light passes, photosensitive means generating electrical signals in response to the light beam passing through said sedimentation cells, a cathode ray tube having a vertical deflection system to which said electrical signals are applied, means for causing a horizontal deflection in said cathode ray tube simultaneously with the light scanning of each separate cell during the rotation of said rotor, control means for controlling the intensity of the electron beam in said cathode ray tube, comprising a member rotating with said rotor, stationary members equal in number to said sedimentation cells cooperating with said member, said control means comprising a switch to connect one or more of said stationary members to the input of electronic means whose output serves to control the intensity of the electron beam so that only signals from desired sedimentation cells are displayed on the screen of said cathode ray tube, thus making possible simultaneous observation or registration of measuring curves for two or more arbitrarily chosen sedimentation cells superposed on said cathode ray tube.

10. A system as set forth in claim 9 wherein said electronic means is a multi-vibrator.

References Cited

FOREIGN PATENTS 1,145,388   10/1963   Germany.
1,149,188   12/1963   Germany.

RONALD L. WIBERT, Primary Examiner
F. L. EVANS, Assistant Examiner

U.S. Cl. X.R.
250—218; 356—201, 205